ated May 2, 1961

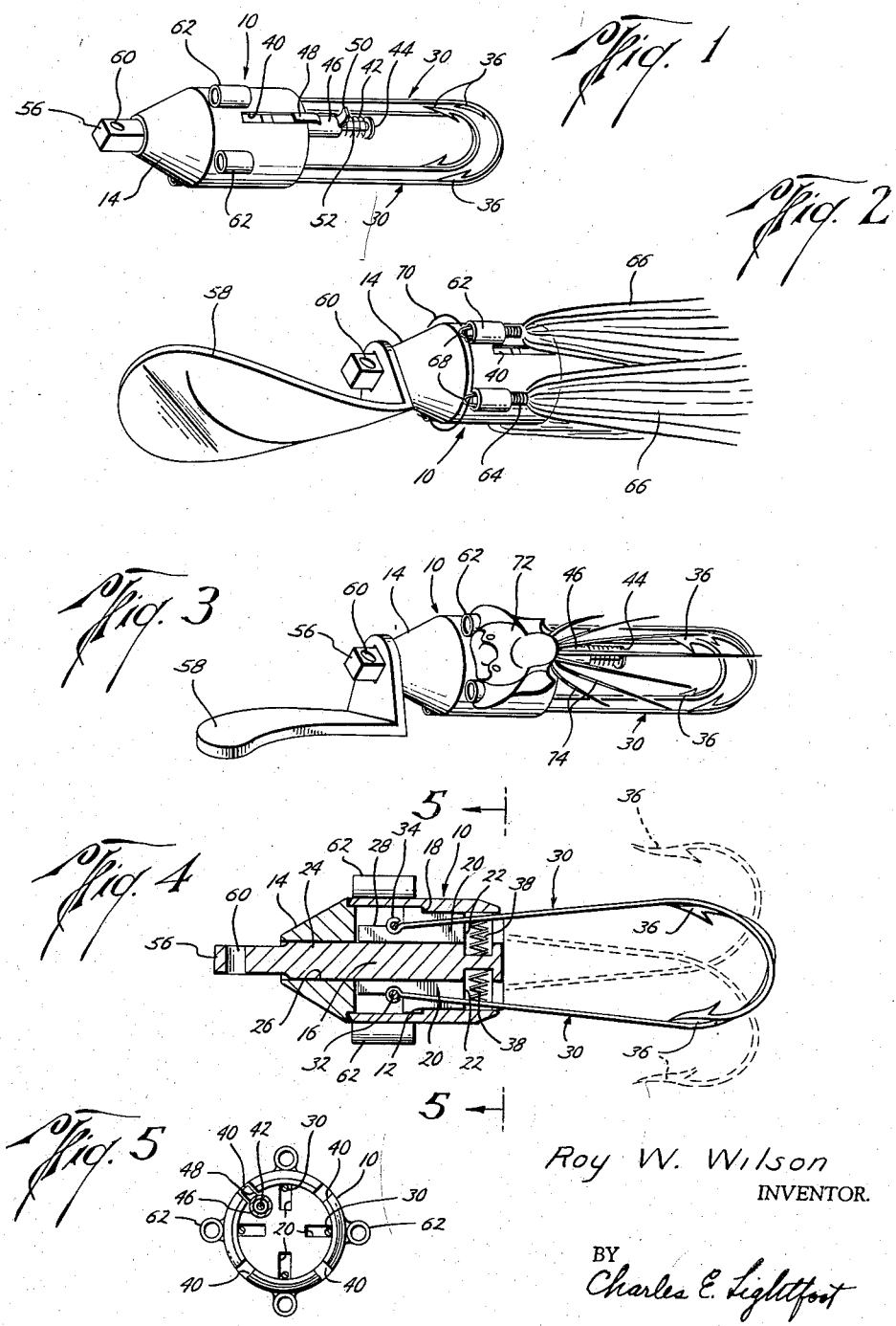

2,982,046
NON-SNAGGING MULTIPLE HOOK FISHING DEVICE

Roy W. Wilson, Bellaire, Tex.
(5600 Ridge Oak Drive, Austin 3, Tex.)

Filed Nov. 6, 1958, Ser. No. 772,311

2 Claims. (Cl. 43—35)

This invention relates to a fishing hook device and more particularly to fish hook mechanism employing a multiplicity of hooks, which are arranged to prevent snagging or catching of the hooks in weeds or on underwater obstructions, but which operate to catch a fish when the fish bites.

In the art of catching fish making use of a conventional line and hook arrangement, the hooks often become caught in weeds or snagged in submerged objects, making it difficult if not impossible to retrieve the same and resulting in the loss of the hooks and other equipment attached to the line.

Various devices have been proposed heretofore for use with fish hooks to prevent the snagging of the hooks or the catching or entangling of the same in weeds or other submerged objects while at the same time permitting the hooks to catch fish when the fish bite. Such devices, however, do not lend themselves well to use with a multiple or gang hook arrangement and as usually constructed are not effective to prevent catching of the hooks on submerged logs, sticks or other obstructions which are not relatively flexible or yieldable objects such as weeds.

The present invention has for an important object the provision of a fishing device having a multiplicity of hooks which are arranged in a manner to effectively prevent the snagging of the hooks on submerged objects, but which when bitten by a fish will readily catch the fish.

Another object of the invention is to provide a multiple or gang hook device wherein the hooks are arranged with their shanks positioned for engagement with submerged objects, to prevent the points of the hooks from contacting such objects, but to permit the points to be moved by engagement with the mouth of a fish when the fish bites to positions to catch the fish.

Another object of the invention is the provision of a multi-hook fishing device embodying means engageable with the eyes of a number of hooks to support the hooks for lateral swinging movement relative to each other, and means for yieldingly holding the hooks in position wherein the shanks of the hooks are located to prevent the points of the hooks from engaging submerged objects, but which may yield to permit the hooks to be moved by the action of the jaws of a fish to position the points to catch the fish.

A further object of the invention is to provide a multiple hook fishing device wherein a number of hooks are pivotally mounted for movement into a grouped arrangement wherein the shanks of the hooks are positioned to prevent snagging of the points of the hooks on submerged objects and to be engaged by the jaws of a fish when the fish bites to move the points of the hooks to positions to catch the fish, and including means operable to releasably latch the hooks in such grouped arrangement but which may be released to permit the hooks to be spread apart for the application of bait to the hooks.

A still further object of the invention is the provision of a multi-hook fishing device which may be used interchangeably with various different kinds of artificial bait to form artificial lures.

The above and other important objects and advantages of the invention may best be understood from the following detailed description, constituting a specification of the same, when considered in conjunction with the annexed drawings, wherein—

Figure 1 is a perspective view illustrating the invention and showing the hooks of the same in position for catching a fish;

Figure 2 is a view similar to that of Figure 1 showing the device of the invention as employed with a preferred form of artificial bait attached hereto and with spinner means for causing rotation of the device in use;

Figure 3 is a view similar to that of Figure 2 showing the device of the invention with a somewhat different form of artificial bait applied thereto;

Figure 4 is a longitudinal, central, cross-sectional view of the invention as illustrated in Figure 1, showing the details of construction and arrangement of the parts of the device; and Figure 5 is a cross-sectional view, taken along the line 5—5 of Figure 4, looking in the direction indicated by the arrows.

Referring now to the drawings in greater detail, the fishing device of the invention comprises an outer tubular part or housing 10, formed with an internal annular shoulder 12, shown in Figure 4, and having an end closure or cap 14 at one end. An inner part or body 16 is rotatably mounted in the housing and is formed with an external shoulder 18, shown in Figure 4, positioned for engagement with the internal shoulder 12. The body 16 is also formed with radially extending externally opening, longitudinal slots 20, and with externally opening spring receiving recesses 22 opening into the slots, and is provided with a central, longitudinally extending stem 24 which is rotatably extended through a central opening 26 in the closure 14.

Within the housing 10, the body is formed with an externally reduced portion 28, through which the slots 20 extend, and a hook 30 is extended into each of the slots and pivotally secured to the body by a ring 32, extending about the reduced portion 28 and through the eyes 34 of the hooks. The hooks 30 are preferably formed with elongated shanks extending beyond the open end of the housing, which shanks may be of different lengths to permit the hooks to be arranged in a grouped formation as best seen in Figures 1 and 3, with the points 36 of the hooks lying inwardly of the shanks, and the shanks extending radially beyond the points in position to engage submerged objects to prevent the hooks from catching on such objects, when the device is in use.

Yieldable means, such as the coil springs 38 are positioned in the recesses 22 of the body in position for engagement with the shanks of the hooks to yieldingly urge the hooks outwardly away from each other to yieldingly hold the hooks in grouped positions with the shanks of the hooks extending radially beyond the points.

It will be apparent that with the hooks grouped in the manner described, the points of the hooks are protected by the shanks, and when the device is in use pressure exerted on the shanks by the fish biting will move the shanks toward each other to the dotted line positions illustrated in Figure 4, to extend the points of the hooks radially beyond the shanks in position to catch the fish.

The housing 10 is formed with side slots 40, positioned to be moved into and out of registration with the slots 20 of the body by relative rotation of the housing and body, so that when the slots 40 are in registration with the slots 20, the shanks of the hooks 30 may move radially through the slots 40 away from each other to permit the hooks to be spread apart for the purpose of attaching bait to the hooks when desired.

It will be apparent that by aligning the slots 40 with the slots 20, the hooks may be spread apart and any desired bait applied to the hooks, after which the hooks may be moved toward each other through the slots 40 into the slots 20, against the resistance of the coil springs 38, to group the hooks in the manner illustrated in Figures 1 and 3, whereupon the body and housing may be rotated relative to each other to move the slots 40 and 20 out of alignment to hold the hooks in their grouped positions.

Suitable latching means, such as that illustrated in Figures 1 and 3 is provided for holding the housing and body against relative rotation. The latching means in the present illustration takes the form of a shaft or pin 42 fixed at one end to the body and having a head 44 at its free end, and upon which shaft a tubular element 46 is slideably mounted for longitudinal movement, which element has an extension 48 positioned to enter one of the slots 40 to hold the housing and body against relative rotation. The element 46 also has an operating projection 50, whereby the element may be moved longitudinally on the shaft 42 to disengage the extension 48 from the slot 40 and the element is yieldingly urged toward latching position by coil spring 52, surrounding the shaft 42 and which bears at one end against the head 44 and at the other end on the adjacent end of the tubular element. It will be apparent that by moving the tubular element 46 toward the head 44 by pressing on the operating extension 50 against the resistance of the spring 52, the extension 48 may be released from the slot 40, to permit the housing and body to be rotated relative to each other, to align the slots 20 and 40 to permit spreading apart of the hooks for the purpose of applying bait. After the hooks have been baited and moved into the slots 20 and are in the grouped arrangement illustrated in Figures 1 and 3, the body and housing may be rotated relative to each other to move the slots 20 and 40 out of alignment, and to permit the extension 48 to be moved into one of the slots 40, as shown in Figure 1, to hold the hooks in grouped arrangement.

The stem or shank 24 of the body may be provided with a squared portion 56, upon which a spinner element 58, having a squared opener is positioned whereby the device may be caused to rotate as it is drawn through the water in the usual manner. The stem portion 46 is perforated as shown at 60 to permit the attachment of a fishing line to the device in a conventional manner, which line may be provided with a swivel, not shown, to prevent twisting of the line upon rotation of the device.

The housing may be provided with peripherally spaced tubular sockets 62 about its exterior, through which shank portions 64 of artificial lure devices may be extended, such as the artificial lures illustrated in Figure 2, which are formed with eyes 68 on their shanks through which a wire or ring 70 may be extended when the shanks have been inserted through the sockets, to hold the lures in position on the housing. The lures 66 may be of any desired type, having strands, hairs, feathers or the like positioned to conceal the hooks, so that when a fish bites the lures, the hooks will be moved to their active positions to catch the fish.

A somewhat different type of artificial lure is illustrated in Figure 3 wherein the lure has a body portion 72, which may be in the form of a bug or the like shaped for engagement with the sockets 62 to hold the lure on the housing, and also having strands 74 or the like positioned in overlying relation to other hooks to attract the fish, so that when the fish bites, the points of the hooks will be moved to their active positions to catch the fish.

It will be understood, of course, that various kinds of artificial lures may be employed with the device of the invention, other than those illustrated herein, and that other kinds of bait than artificial lures may be used on the hooks.

The spinner element 58 is preferably formed of flexible material, such as rubber, plastics or the like, so that this element may bend to prevent catching of the element on submerged objects.

In making use of the invention constructed as described above, the hooks 30 are positioned in their grouped arrangement with the housing and body latched against relative rotation, and the device is cast into the water in the usual manner attached to a fishing line. With the hooks grouped as illustrated and described, the device may move through the water without danger of snagging of the hooks on submerged objects or entangling of the same in weeds, but when the hooks enter a fish's mouth, and the fish bites, the shanks of the hooks will be engaged by the jaws of the fish to move the points of the hooks to their extended positions to catch the fish. It will also be apparent that by releasing the latch mechanism, the parts may be rotated to permit the hooks to be spread apart for the application thereto of bait, and that the hooks may then be re-positioned in their grouped relation and the parts latched to hold the hooks with their points protected by the shanks.

It will thus be seen that the invention provides a non-snagging multi-hook fishing device which is easily baited and which may be used in weedy locations or where submerged objects are likely to be encountered.

The invention is discolsed herein in connection with a specific embodiment of the same, but it will be understood that this is intended by way of an example only and that various changes can be made in the construction and arrangement of the various parts within the spirit of the invention and the scope of the appended claims.

Having thus clearly shown and described the invention, what is claimed as new and desired to secure by Letters Patent is:

1. A fishing device comprising inner and outer concentrically arranged parts of circular cross-sectional shape rotatable relative to each other, means for connecting said inner part to a fishing line, there being longitudinally extending slots in the parts positioned for movement into and out of registering relation upon relative rotation of the parts, a fish hook having a shank portion extending into each slot in and pivotally connected to said inner part for radial swinging movement inwardly and outwardly relative to said inner part through the corresponding slot of said outer part when the slots of the parts are in registration, yieldable means positioned for coaction with said inner part and said shanks to yieldingly urge the shanks radially away from said inner part, and means for holding the parts against relative rotation when the slots of the parts are out of registration to hold the hooks against such outward swinging movement.

2. A fishing device comprising inner and outer concentrically arranged parts of circular shape in cross-section rotatable relative to each other, means for connecting said inner part to a fishing line, there being longitudinally extending slots in the parts positioned for movement into and out of registration upon relative rotation of the parts, a fish hook having a shank extending into each slot in and pivotally connected to said inner part for radial swinging movement relative to said inner part inwardly and outwardly through the corresponding slot of the outer part when the slots of the parts are in registration, said shanks being engageable with said outer part when the slots of the parts are out of registration to hold the shanks in substantially parallel positions with the points of the hooks located radially inwardly between the shanks in position to be extended radially outwardly beyond the shanks upon movement of the shanks toward each other, and yieldable means positioned for coaction with said inner part and said shanks to urge the shanks radially away from said inner part.

References Cited in the file of this patent

UNITED STATES PATENTS

| | | |
|---|---|---|
| 1,031,903 | Anderson | July 9, 1912 |
| 1,069,093 | Faught | July 29, 1913 |
| 2,841,913 | Pearson | July 8, 1958 |

FOREIGN PATENTS

| | | |
|---|---|---|
| 264,837 | Germany | Oct. 21, 1913 |